3,028,437
CONDENSATION OF CHLOROBENZENE AND FORMALDEHYDE WITH PROMOTED CLAY CATALYSTS
John W. Schick, Delaware Township, Camden County, N.J., assignor to Socony Mobil Oil Company, Inc., a corporation of New York
No Drawing. Filed Nov. 3, 1959, Ser. No. 850,511
4 Claims. (Cl. 260—649)

This invention is concerned with the condensation of aromatic compounds with formaldehyde. It is more particularly concerned with a process for condensing chlorobenzene and formaldehyde to form, almost exclusively, polymer oils.

As is well known to those familiar with the art, it has been proposed to condense aromatic hydrocarbons, such as benzene, or phenols with formaldehyde to produce high molecular weight resinous materials. Generally, acidic clay catalysts have been sufficient. In the case of chlorobenzene as the aromatic compound reactant, however, the condensation with formaldehyde appears to be hindered so that yields are relatively low, in the presence of clay catalysts. The use of more drastic catalysts and conditions leads to the formation of resinous products for the most part.

Oily low molecular weight polymers of chlorobenzene and formaldehyde are highly desirable as special solvents, as insecticides, and as secondary plasticizers for polyvinylchloride resins. Particularly suitable oils would be mixtures of bis (chlorophenyl) methane ("dimer") and bis(chlorobenzyl) chlorobenzene ("trimer"). In this connection it is highly desirable to be able to produce such a mixture of dimer and trimer to the substantial exclusion of higher molecular weight, resinous products.

In a copending application Serial Number 850,510, filed November 3, 1959, a process and conditions were defined to effect the aforementioned condensation of chlorobenzene and formaldehyde in the presence of strong sulfuric acid catalyst. The use of sulfuric acid catalyst, however, requires extra handling steps, including separation of aqueous catalyst layer and removal of residual acid in the product. If such steps can be avoided, the process would be much simpler from the standpoint of commercial operation. If reasonable yields were obtainable with a solid catalyst, such simplification could be achieved. The water of reaction could be removed by vacuum or by azeotropic distillation and the solid catalyst could be removed by simple filtration.

It has now been found that an oily polymer can be made simply and economically with a solid catalyst. It has been discovered that chlorobenzene and formaldehyde can be condensed to produce a mixture of dimer and trimer to the substantial exclusion of higher molecular weight resinous product, in the presence of sulfuric acid-promoted acid clay catalyst.

Accordingly, it is a broad object of this invention to provide a process for producing useful polymer oils. Another object is to provide a process for condensing chlorobenzene and formaldehyde to produce an oily polymer with low production of resinous polymer. A specific object is to provide a process for producing a mixture of bis(chlorophenyl) methane and bis(chlorobenzyl) chlorobenzene to the substantial exclusion of higher molecular weight, resinous polymers, in the presence of a solid catalyst. A more specific object is to provide a process for producing this polymer mixture in the presence of acid-promoted clay catalyst. Other objects and advantages of this invention will become apparent to those skilled in the art from the following detailed description.

In general, the present invention provides a process for producing a polymer oil, that comprises reacting formaldehyde with chlorobenzene, in a weight ratio of formaldehyde to chlorobenzene varying between about 0.08 and about 0.2; in the presence of a solid catalyst comprising between about 0.2 percent and about 20 percent, by weight of the catalyst, sulfuric acid supported on an acid treated clay of the montmorillonite type; and the weight ratio of said catalyst to chlorobenzene varying between about 0.1 and about 0.4; at a temperature varying between about 100° C. and about 135° C.; and for a period of time varying between about 3 hours and about 5 hours.

THE REACTANTS

The reactants used in the process of this invention are chlorobenzene and formaldehyde. Chlorobenzene (monochlorobenzene or phenyl chloride) is a well known compound that is readily available commercially. It can be used in technical grade, but substantially pure chlorobenzene is preferred. Chlorobenzene is produced by methods well known in the art, such as by catalytic chlorination of benzene.

The formaldehyde reactant can be the polymeric formaldehyde, paraform (paraformaldehyde), or in the form of the cyclic trimer, trioxane. Dilute solutions of formaldehyde, such as formalin, are not desirable, because they introduce too much water into the reaction system. Formaldehyde in its various forms is well known and readily available commercially.

The catalyst utilizable in the process of this invention comprises between about 0.2 percent and about 20 percent, by weight of the catalyst, of sulfuric acid ($H_2SO_4$) supported on acid treated clay of the montmorillonite type. This catalyst is a dry, solid catalyst. In the runs described hereinafter, the support was a non-swelling bentonite clay of the montmorillonite type which had been activated by acid treatment to give a composition $Al_2Si_4O_{10}(OH)2 \cdot nH_2$. This product is available in the activated state under the trade name "Super Filtrol." The acid activation treatment is well known to those skilled in the art and is described more or less in detail by B. A. Stagner in "The Science of Petroleum," volume III, page 1699 (Oxford Press) (1938). For the activation of small quantities of clay a similar treatment may be used. Thus, one kilogram of bentonite is boiled with 2,000 cubic centimeters of 17 percent sulfuric acid for three hours. The mixture is filtered and the clay washed with distilled water until the filtrate is substantially free from acid (0.2 to 0.5 percent acid). The clay is then dried to a moisture content of about 15 percent and ground to pass a 200-mesh screen. When the acid treated clay is washed with "hard" water after the acid is neutralized, the clay is injured by absorbing basic ions from the water.

When only a portion of the total extractable material is leached from the clay by the acid, the maximum activity is developed. The optimum concentration of the acid is about 15 percent to about 20 percent. Sulfuric and hydrochloric acids are the most economical to use although sulfuric acid is somewhat slower than hydrochloric.

In order to achieve reasonable yields of dimer and trimer products, the reaction conditions and the proportions of reactants and catalyst are important. The process is carried out at temperatures of between about 100° C. and about 135° C. for periods of time varying between about 3 hours and about 5 hours. As is usually the case in chemical processes, the temperature and the reaction time generally vary inversely.

The catalyst to chlorobenzene weight ratio will be between about 0.1 and about 0.4, and preferably between about 0.1 and about 0.25. Generally, the formaldehyde to chlorobenzene weight ratio will be between about 0.08 and about 0.2, and preferably between about 0.1 and 0.15.

STANDARD RUN PROCEDURE

In all the runs described and discussed herein, the following standard procedure was used:

chlorobenzene and paraformaldehyde were reacted in the presence of a larger amount of catalyst containing about 10% $H_2SO_4$. Pertinent data are set forth in Table I.

TABLE I

| Item No. | Run No. | Chlorobenzene, g. | Catalyst | | Paraform,[a] g. | Temp., °C. | Time, Hr. | Fraction | | Residue, g. | Total, g. | Percent conversion | |
|---|---|---|---|---|---|---|---|---|---|---|---|---|---|
| | | | Filtrol, g. | 98% $H_2SO_4$, g. | | | | #1[b] | #2[c] | | | Chlorobenzene | Paraform |
| 1 | 111 | 500 | 50 | ------ | 4 x 12 | 105–130 | 5 | 57 | 16 | 3 | 76 | 14.2 | 16.9 |
| 2 | 134 | 500 | 50 | 5.0 | 35 | 100–138 | 5 | 81 | 10 | 3 | 94 | 17.6 | 27.4 |
| 3 | 135 | 500 | 50 | 10.0 | 35 | 100–138 | 5 | 76 | 10 | 4 | 90 | 17.1 | 23.7 |
| 4 | 137 | 500 | 50 | 1.0 | 5 x 12 | 100–135 | 5 | 91 | 25 | 7 | 123 | 23.0 | 26.1 |
| 5 | 138 | 500 | 50 | 2.5 | 5 x 12 | 100–135 | 3 | 95 | 26 | 9 | 130 | 24.3 | 22.9 |
| 6 | 149 | 500 | 100 | 10.0 | 60 | 100–115 | 3 | 93 | 20 | 8 | 121 | 22.3 | 21.2 |

[a] Analysis=91% formaldehyde, 9% water.
[b] Fraction 1—bis(chlorophenyl) methane.
[c] Fraction 2—bis(chlorobenzyl) chlorobenzene.

SINGLE CH₂O ADDITION

All the ingredients were weighed into a reaction vessel. The sulfuric acid on clay catalyst was added last. The temperature of the mixture was gradually raised to 100° C. (over about one hour) and held at 100° C. for one hour. Finally, the temperature was raised as rapidly as possible to reflux temperature consistent with the rate of water evolution. After reaching reflux conditions, the temperature was held until a total elapsed time of about 3 hours which includes the time necessary to raise the temperature from 100° C. to reflux. The mixture was cooled and the clay removed by filtration. Then, the organic layer was subjected to distillation.

Unreacted chlorobenzene was stripped, and the remainder of the organic layer was fractionated into three fractions, namely, Fraction I (or "dimer") the bis(chlorophenyl) methane—B.P. 640–660° F.; Fraction II (or "trimer") the bis(chlorobenzyl) chlorobenzene—B.P. 850–870° F.; and a higher boiling resinous higher polymer.

MULTIPLE CH₂O ADDITIONS

Formaldehyde was added portionwise at about 100–105° C. to a reaction vessel containing the rest of the ingredients. Each portion added was spaced about one-half hour apart to permit the complete removal of water of reaction. When the formaldehyde additions were completed, the temperature was raised to reflux point and held until a total elapsed time of about 3–5 hours reaction time was attained. Work-up procedure was as described in the single addition procedure.

Example 1

Using the standard run procedure, chlorobenzene and paraformaldehyde were reacted in the presence of Filtrol clay catalyst that had no $H_2SO_4$ thereon. The addition of paraformaldehyde was made in four 12 g. portions. Reaction conditions, proportions of reactants, and results are set forth in Table I.

Examples 2 and 3

Using the standard run procedure, wherein all the paraform was added to the reaction mixture initially, chlorobenzene and paraformaldehyde were reacted, in two separate runs. In each run a different strength catalyst (in terms of amount of $H_2SO_4$ content) was used. Pertinent data are set forth in Table I.

Examples 4 and 5

Using the standard run procedure wherein paraformaldehyde was added in five 12 g. portions, chlorobenzene and paraformaldehyde were reacted in two separate runs. In each run, a different strength catalyst was used. Pertinent data are set forth in Table I.

Example 6

Using the standard run procedure wherein all the paraformaldehyde was added to the reaction mixture initially, From the data in Table I it will be noted that montmorillonite clay alone gives low yield of products (Example 1). In Examples 2 and 3, yields were not much improved using the catalyst contemplated in the process of this invention. This was because the ratio of formaldehyde to chlorobenzene was too low, i.e., below the range defined hereinbefore. On the other hand (Examples 4, 5 and 6), runs carried out at conditions and ratios all within the defined ranges gave greatly improved, and acceptable, yields of product.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing a polymer oil, that comprises reacting formaldehyde with chlorobenzene, in a weight ratio of formaldehyde to chlorobenzene varying between about 0.08 and about 0.2; in the presence of a solid catalyst comprising between about 0.2 percent and about 20 percent, by weight of the catalyst, sulfuric acid supported on an acid treated clay of the montmorillonite type; and the weight ratio of said catalyst to chlorobenzene varying between about 0.1 and about 0.4; at a temperature varying between about 100° C. and about 135° C.; and for a period of time varying between about 3 hours and about 5 hours.

2. A process for producing a polymer oil, that comprises reacting formaldehyde with chlorobenzene, in a weight ratio of formaldehyde to chlorobenzene varying between about 0.1 and about 0.15; in the presence of a solid catalyst comprising between about 0.2 percent and about 20 percent, by weight of the catalyst, sulfuric acid supported on an acid treated clay of the montmorillonite type; and the weight ratio of said catalyst to chlorobenzene varying between about 0.1 and about 0.25; at a temperature varying between about 100° C. and about 135° C.; and for a period of time varying between about 3 hours and about 5 hours.

3. The process defined in claim 1, wherein said formaldehyde is added portionwise to said chlorobenzene and said catalyst.

4. The process defined in claim 2 wherein said formaldehyde is added portionwise to said chlorobenzene and said catalyst.

References Cited in the file of this patent

UNITED STATES PATENTS

| | | |
|---|---|---|
| 2,548,982 | Kemp | Apr. 17, 1951 |
| 2,854,493 | Fetterly | Sept. 30, 1958 |
| 2,937,212 | Breier et al. | May 17, 1960 |

FOREIGN PATENTS

| | | |
|---|---|---|
| 537,880 | Canada | Mar. 5, 1957 |